US012638050B2

(12) United States Patent
Tajima et al.

(10) Patent No.: US 12,638,050 B2
(45) Date of Patent: May 26, 2026

(54) WEAR-RESISTANT MEMBER

(71) Applicant: NGK INSULATORS, LTD., Nagoya City (JP)

(72) Inventors: Yuichi Tajima, Nagoya City (JP); Yoshimasa Kondo, Nagoya City (JP)

(73) Assignee: NGK INSULATORS, LTD., Nagoya (JP)

( * ) Notice: Subject to any disclaimer, the term of this patent is extended or adjusted under 35 U.S.C. 154(b) by 391 days.

(21) Appl. No.: 17/445,971

(22) Filed: Aug. 26, 2021

(65) Prior Publication Data

US 2021/0388868 A1 Dec. 16, 2021

Related U.S. Application Data

(63) Continuation of application No. PCT/JP2019/013457, filed on Mar. 27, 2019.

(51) Int. Cl.
| | |
|---|---|
| *B21B 19/04* | (2006.01) |
| *B21B 27/02* | (2006.01) |
| *C22C 27/00* | (2006.01) |
| *C22C 27/02* | (2006.01) |
| *C22C 27/04* | (2006.01) |
| *C22C 27/06* | (2006.01) |
| *C22C 29/00* | (2006.01) |
| *C22C 29/02* | (2006.01) |
| *C22C 29/04* | (2006.01) |
| *C22C 29/06* | (2006.01) |
| *C22C 29/08* | (2006.01) |
| *C22C 29/10* | (2006.01) |
| *C22C 29/12* | (2006.01) |
| *C22C 29/14* | (2006.01) |
| *C22C 29/16* | (2006.01) |
| *C22C 29/18* | (2006.01) |
| *C22C 30/00* | (2006.01) |
| *C22C 32/00* | (2006.01) |

(Continued)

(52) U.S. Cl.
CPC ............ *F16C 33/121* (2013.01); *B21B 27/02* (2013.01); *C22C 27/00* (2013.01); *C22C 27/02* (2013.01); *C22C 27/025* (2013.01); *C22C 27/04* (2013.01); *C22C 27/06* (2013.01); *C22C 29/00* (2013.01); *C22C 29/005* (2013.01); *C22C 29/02* (2013.01); *C22C 29/04* (2013.01); *C22C 29/067* (2013.01); *C22C 29/08* (2013.01); *C22C 29/10* (2013.01); *C22C 29/12* (2013.01); *C22C 29/14* (2013.01); *C22C 29/16* (2013.01); *C22C 29/18* (2013.01); *C22C 30/00* (2013.01); *C22C 32/00* (2013.01); *C22C 32/0005* (2013.01); *C22C 32/001* (2013.01); *C22C 32/0021* (2013.01); *C22C 32/0026* (2013.01); *C22C 32/0031* (2013.01); *C22C 32/0047* (2013.01); *C22C 32/0052* (2013.01); *C22C 32/0068* (2013.01); *C22C 32/0073*

(2013.01); *C22C 32/0078* (2013.01); *F16C 33/043* (2013.01); *F16J 1/01* (2013.01); *F16J 1/04* (2013.01); *B21B 2267/24* (2013.01); *B21B 2267/26* (2013.01); *F16C 2202/04* (2013.01); *F16C 2204/52* (2013.01); *F16C 2206/42* (2013.01); *F16C 2206/56* (2013.01); *F16C 2206/58* (2013.01); *F16C 2223/80* (2013.01); *F16C 2240/48* (2013.01); *F16C 2240/94* (2013.01); *F16C 2326/05* (2013.01); *F16C 2360/22* (2013.01)

(58) Field of Classification Search
CPC . B21B 27/02; B21B 2267/24; B21B 2267/26; C22C 29/00; C22C 29/005; C22C 29/02; C22C 29/04; C22C 29/10; C22C 29/08; C22C 29/067; C22C 29/12; C22C 29/14; C22C 29/16; C22C 29/18; C22C 30/00; C22C 32/00; C22C 32/0005; C22C 32/001; C22C 32/0021; C22C 32/0026; C22C 32/0031; C22C 32/0047; C22C 32/0052; C22C 32/0068; C22C 32/0073; C22C 32/0078; C22C 27/00; C22C 27/02; C22C 27/025; C22C 27/04; C22C 27/06; F16C 33/053; F16C 33/121; F16C 33/043; F16C 2202/04; F16C 2204/52; F16C 2206/56; F16C 2206/42; F16C 2206/58; F16C 2223/80; F16C 2240/48; F16C 2240/94; F16C 2326/05; F16C 2360/22; F16J 1/01; F16J 1/04

See application file for complete search history.

(56) References Cited

U.S. PATENT DOCUMENTS

| | | |
|---|---|---|
| 5,880,382 A | 3/1999 | Fang et al. |
| 2005/0118441 A1 | 6/2005 | Tenmaya et al. |

(Continued)

FOREIGN PATENT DOCUMENTS

| | | |
|---|---|---|
| EP | 3 170 588 A1 | 5/2017 |
| JP | S60-224762 A | 9/1985 |

(Continued)

OTHER PUBLICATIONS

Japanese Office Action (Application No. 2021-508570) dated Apr. 5, 2022 (with English translation).

(Continued)

*Primary Examiner* — Michael E. La Villa
(74) *Attorney, Agent, or Firm* — BURR PATENT LAW, PLLC

(57) ABSTRACT

A wear-resistant member that is slidingly contacted with a hard member, wherein the wear-resistant member is formed of an alloy in which hard particles having an average particle size of 10 to 150 μm are bonded by a bonding portion.

6 Claims, No Drawings

(51) Int. Cl.
*F16C 33/04* (2006.01)
*F16C 33/12* (2006.01)
*F16J 1/01* (2006.01)
*F16J 1/04* (2006.01)
*F16L 9/02* (2006.01)

(56) References Cited

U.S. PATENT DOCUMENTS

| | | | |
|---|---|---|---|
| 2007/0251732 A1* | 11/2007 | Mirchandani | E21B 10/633 |
| | | | 175/434 |
| 2008/0029310 A1* | 2/2008 | Stevens | C22C 29/00 |
| | | | 175/375 |
| 2017/0145875 A1* | 5/2017 | Hashimoto | C22C 9/00 |
| 2019/0194783 A1 | 6/2019 | Ohata | |
| 2019/0352753 A1 | 11/2019 | Kimura et al. | |
| 2020/0346285 A1 | 11/2020 | Liu et al. | |

FOREIGN PATENT DOCUMENTS

| | | | |
|---|---|---|---|
| JP | 60224762 A | * | 11/1985 |
| JP | 07259517 A | * | 10/1995 |
| JP | 2002-053883 A | | 2/2002 |
| JP | 2003-160831 A | | 6/2003 |
| JP | 2005-126752 A | | 5/2005 |
| JP | 6026015 B2 | | 11/2016 |
| JP | 6313844 B1 | | 4/2018 |
| JP | 2018-103245 A | | 7/2018 |
| JP | 2021-501258 A | | 1/2021 |
| WO | 2018/025848 A1 | | 2/2018 |
| WO | 2019/087097 A2 | | 5/2019 |

OTHER PUBLICATIONS

English translation of the International Preliminary Report on Patentability (Chapter I) dated Oct. 7, 2021 (Application No. PCT/JP2019/013457).

International Search Report and Written Opinion (Application No. PCT/JP2019/013457) dated Jun. 25, 2019.

German Office Action (with English translation) dated Nov. 17, 2024 (Application No. 11 2019 007 092.4).

* cited by examiner

WEAR-RESISTANT MEMBER

FIELD OF THE INVENTION

The present invention relates to a wear-resistant member.

BACKGROUND OF THE INVENTION

Wear-resistant members are used in abrasion portions of various machines, parts, tools and the like.

For example, Patent Literature 1 proposes a technique for improving wear resistance of a rolling compound roll by providing a homogeneous outer layer of MC-type carbide to the rolling compound roll used in a hot strip mill for hot rolling by centrifugal casting.

Further, Patent Literature 2 proposes a technique for forming a lubricating film having improved wear resistance at a portion where sliding occurs under lubrication in an oil, such as a skirt portion of a piston in an engine, using a sliding member composition having a solid lubricant and a wear-resistant agent dispersed in a polyamide-imide resin.

Further, Patent Literature 3 proposes a technique for improving wear resistance of an automobile suspension member by forming a lithium/iron composite oxide layer on the outermost surface.

Furthermore, it is known that sintered hard materials such as cemented carbide, cermet, and ceramics also have good wear resistance.

CITATION LIST

Patent Literatures

[Patent Literature 1] Japanese Patent No. 6313844 B
[Patent Literature 2] Japanese Patent Application Publication No. 2002-53883 A
[Patent Literature 3] Japanese Patent Application Publication No. 2005-126752 A

SUMMARY OF THE INVENTION

The present invention relates to a wear-resistant member that is slidingly contacted with a hard member, wherein the wear-resistant member is formed of an alloy in which hard particles having an average particle size of 10 to 150 μm are bonded by a bonding portion.

DETAILED DESCRIPTION OF THE INVENTION

In recent years, wear-resistant members have been used at various positions, and the wear-resistant members have been often brought into contact with each other. The wear resistance of the wear-resistant member varies depending on properties of the wear-resistant member itself, as well as properties of a material of a contacting partner (mating material). Therefore, the contact of the wear-resistant members with each other may not provide sufficient wear resistance of each wear-resistant member.

For example, all of the outer layer described in Patent Literature 1, the lubricating film described in Patent Literature 2, and the lithium-iron composite oxide layer described in Patent Literature 3 have good wear resistance to the mating material made of a specific material. However, there is a problem that when the mating material is a sintered hard material such as cemented carbide, cermet and ceramics, the wear resistance is not sufficient.

The present invention has been made to solve the above problems. An object of the present invention is to provide a wear-resistant member that is hard to wear when it is slidingly contacted with various hard members.

As a result of intensive studies to solve the above problems, the present inventors have found that an alloy in which hard particles having a specific average particle size are bonded by a bonding portion has improved wear resistance to various hard members, and they have completed the present invention.

According to the present invention, it is possible to provide a wear-resistant member that is hard to wear when it is slidingly contacted with various hard members.

Hereinafter, embodiments according to the present invention will be specifically described. It is to understand that the present invention is not limited to the following embodiments, and various modifications and improvements, which will be within the scope of the present invention, may be made based on ordinary knowledge of a person skilled in the art, without departing from the spirit of the present invention.

A wear-resistant member according to an embodiment of the present invention is formed of an alloy in which hard particles having an average particle size of 10 to 150 μm are bonded by a bonding portion.

The average particle size of the hard particles of 10 μm or more can ensure wear resistance to a hard member (mating material) that is slidingly contacted with the wear-resistant member. Further, the average particle size of the hard particles of 150 μm or less can prevent a surface of the wear-resistant member from becoming too rough, so that the wear-resistant member can be used for applications in which the wear-resistant member is slidingly contacted with the mating material. The average particle size of the hard particles is preferably 12 to 140 μm, and more preferably 14 to 120 μm.

As used herein, the average particle size of the hard particles in the wear-resistant member means an average value of a horizontal feret diameter and a vertical feret diameter in a cross-sectional image obtained by image analysis of a cross section of the wear-resistant member. More particularly, the horizontal feret diameter and the vertical feret diameter are measured for at least 100 or more hard particles in the cross-sectional image. The average value of both feret diameters of the hard particles is then added up and divided by the number of measured particles to provide the average particle size of the hard particles. The image analysis of the cross section of the wear-resistant member can be carried out using an optical microscope, a SEM (scanning electron microscope), an energy dispersive X-ray (EDS), or the like.

A type of the alloy is preferably cemented carbide, although not particularly limited thereto.

The hard particles are not particularly limited, and they may employ those commonly used for alloys. Examples of the hard particles include particles of carbides, nitrides, silicides, as well as oxides and like of W, Ti, Zr, Hf, V, Nb, Ta, Cr and Mo. These may be used alone or in combination of two or more. Further, among them, the hard particles are preferably WC in terms of the wear resistance.

The bonding portion preferably includes one or more selected from Ni and Co, although not particularly limited thereto. The use of such a bonding portion can allow any impact from the mating material to be alleviated due to elasticity of the bonding portion.

A volume ratio of the bonding portion to the hard particles in the wear-resistant member is preferably 30:70 to 80:20, and more preferably 40:60 to 60:40, although not particularly limited thereto. Such a volume ratio can lead to improved adhesion between the hard particles and the bonding portion, so that it is difficult to fall off the hard particles from the wear-resistant member even if there is aggressive abrasion between the hard particles and the mating material. Therefore, in addition to the impact alleviation due to the elasticity of the bonding portion, an effect of wear resistance due to the hard particles can be further improved.

As used herein, the volume ratio of the bonding portion to the hard particles in the wear-resistant member means an area ratio of a bonding portion to hard particles in a cross section of the wear-resistant member, which cross section is subjected to an image analysis. It should be noted that the image analysis of the cross section of the wear-resistant member can be carried out using an optical microscope, a SEM (scanning electron microscope), an energy dispersive X-ray (EDS), or the like.

As the hard member (mating material) that is slidingly contacted with the wear-resistant member, those known in the art may be used, although not particularly limited. As used herein, the hard member means a member formed of a hard material.

Examples of the hard material forming the hard member include cemented carbides such as HW, HF, HT, and HC defined in JIS B 4053: 2013.

As used herein, HW refers to an alloy comprised of a hard phase and a bonding phase, wherein a main component of the hard phase is WC, and an average particle size of the hard particles contained in the hard phase is 1 μm or more. Further, HF refers to an alloy composed of a hard phase and a bonding phase, wherein a main component of the hard phase is WC, and an average particle size of the hard particles contained in the hard phase is less than 1 μm (generally referred to as ultrafine cemented carbide). Furthermore, HT refers to an alloy composed of a hard phase and a bonding phase, wherein a main component of the hard particles contained in the hard phase is a carbide, carbonitride, and nitride of titanium, tantalum or niobium, and the alloy has a small amount of WC (generally referred to as cermet). Moreover, HC refers to an alloy in which a surface of the cemented carbide as described above is chemically or physically coated with one or more layers of carbides, carbonitrides, nitrides, oxides, diamonds, diamond-like carbon and the like (generally referred to as coated cemented carbide). A Group Fe metal (Fe, Co, Ni) can be used for the bonding phase.

More particularly, examples of the cemented carbide used for the mating material include HW-P01, HW-P10, HW-P20, HW-P30, HW-P40, HW-P50, HW-M10, HW-M20, HW-M30, HW-M40, HW-K01, HW-K10, HW-K20, HW-K30, HW-K40, HT-P01, HT-P10, HT-P20, HT-P30, HT-P40, HT-P50, HT-M10, HT-M20, HT-M30, HT-M40, HT-K01, HT-K10, HT-K20, HT-K30, HT-K40, HF-P01, HF-P10, HF-P20, HF-P30, HF-P40, HF-P50, HF-M10, HF-M20, HF-M30, HF-M40, HF-K01, HF-K10, HF-K20, HF-K30, HF-K40, HC-P01, HC-P10, HC-P20, HC-P30, HC-P40, HC-50, HC-M10, HC-M20, HC-M30, HC-M40, HC-K01, HC-K10, HC-K20, HC-K30, HC-K40, and the like.

When the cemented carbide is used for the mating material, the average particle size of the hard particles is preferably 8 μm or less, and more preferably 5 μm or less, and further preferably 3 μm or less, although not particularly limited thereto. The cemented carbide tends to be harder as the average particle size of the hard particles is smaller. Therefore, the controlling of the average particle size of the hard particles of the mating material in the above range results in an increased hardness difference between the mating material and the wear-resistant member, leading to difficulty of abrasion of the wear-resistant member.

The average particle size of the hard particles contained in the cemented carbide of the mating material can be determined by the same method as that of the average particle size of the hard particles in the wear-resistant member.

The volume ratio of the bonding phase in the cemented carbide used as the mating material is preferably less than 35% by volume, and more preferably 30% by volume or less, and still more preferably 25% by volume or less, although not particularly limited thereto. The volume ratio of the hard phase in the mating material is preferably 65% by volume or more, and more preferably 70% by volume or more, and further preferably 75% by volume or more. The volume ratio of the bonding phase of less than 35% by volume and the volume ratio of the hard particles of 65% by volume or more result in an increased hardness difference between the wear-resistant member and the mating material, leading to difficulty of abrasion of the wear-resistant member.

The volume ratio of the bonding phase to the hard phase in the cemented carbide of the mating material can be obtained by the same method as the volume ratio of the bonding phase to the hard particles in the wear-resistant member.

The mating material has a Rockwell hardness (HRA) of preferably 80 or more, and more preferably 83 or more, and still more preferably 85 or more, in view of ensuring the hardness as the hard member, although not particularly limited thereto.

The wear-resistant member according to an embodiment of the present invention can be produced according to a conventional powder metallurgy method. Specifically, raw material powder of hard particles having an average particle diameter of 10 to 150 μm, metal powder for providing a bonding portion, and a binder may be mixed together to obtain a paste-like forming material, which may be then formed into a predetermined shape and sintered. A solvent may be added to the forming material as needed. A ratio of each powder, sintering conditions, and the like are not particularly limited, and they may be appropriately set depending on the type of powder to be used.

The average particle size of the hard particles of the raw material powder means a particle size (D50) having an integrated value of 50% in a particle size distribution obtained by a laser diffraction/scattering method. There is no significant difference between the average particle diameters obtained by the feret diameter and D50.

EXAMPLES

Hereinafter, the present invention will be described in more detail with reference to Examples, but the present invention is not limited to these Examples.

Example 1

In a beaker, 60 g of raw material powder of WC particles having an average particle size of 110 μm (WC-S from JAPAN NEW METAL CO., LTD.), 28 g of Ni powder (FP-606 from FUKUDA METAL & FOIL POWDER CO., LTD.), and 5 g of a binder (Aron® from TOAGOSEI CO., LTD.) were mixed together to obtain a paste-like forming material. The forming material was then poured into a container made of SUS (inner dimensions: 15 cm×15 cm×15 cm) and then fired in a vacuum furnace at a temperature of 890° C. for 2 hours to provide a wear-resistant member.

Example 2

A wear-resistant member was obtained in the same manner as that of Example 1, with the exception that in a beaker, 60 g of raw material powder of WC particles having an average particle size of 16 µm (WC-S from JAPAN NEW METAL CO., LTD.), 34 g of Ni powder (FP-606 from FUKUDA METAL & FOIL POWDER CO., LTD.), and 5 g of binder (Aron® from TOAGOSEI CO., LTD.) were mixed together to obtain a forming material.

Comparative Example 1

A commercially available cemented carbide (D40 from FUJI DIE Co., Ltd.) was prepared as a wear-resistant member.

The wear-resistant members according to Examples and Comparative Example obtained above were evaluated as follows:

(1) Average Particle Size of Hard Particles, and Volume Ratio of Bonding Portion to Hard Particles The cross section of each wear-resistant member was subjected to image analysis using an optical microscope, and the average particle size and the volume ratio of the bonding portion to the hard particles were determined based on the above method.

(2) Rockwell Hardness (HRA)

The Rockwell hardness was measured using a Rockwell hardness tester.

(3) Wear Amount

Based on ASTM D2670, a wear amount was evaluated using a high-speed Falex type friction test machine (from Shinko Engineering Co., Ltd.). Specifically, the wear amount was measured as follows:

First, a commercially available cemented carbide (D60 from FUJI DIE Co., Ltd.) was prepared as a mating material. The cemented carbide has hard phases containing WC particles with an average particle size of 4 µm dispersed in a bonding phase (Co), and had a volume ratio of the hard phase (WC) to the bonding phase (Co) of 75:25, and a Rockwell hardness of 88. The average particle size, volume ratio and Rockwell hardness of the cemented carbide were measured by the methods as described above.

A cylindrical pin was then collected from the cemented carbide used as the mating material. The pin had a diameter of 6.35 mm and a length of 31.75 mm. Further, a V block was collected from each wear-resistant member obtained in the above Examples and Comparative Example. The V block was a specimen having a diameter of 12.83 mm, a length of 10.16 mm, a V-groove angle of 96°, and a groove width of 6.35 mm. The above pin and V block were then installed in a high-speed Falex type friction test machine.

Next, a ceramic-containing slurry in which 1 kg of ceramics (#220 SiC) was mixed with 300 mL of tap water was prepared, and the ceramic-containing slurry was placed in an oil bath.

A Falex friction test was then conducted while immersing the pin and V block installed in the high-speed Falex type friction test machine in the ceramic-containing slurry in the oil bath. The Falex friction test was carried out under conditions where a rotation speed of the pin was 300 rpm, a test load of the V block on the pin was 500 N, a test time was 60 minutes, a test temperature was room temperature (about 25° C.). After the test, a wear amount (abrasion loss) of the V block was measured.

Table 1 shows the results of each of the above evaluations.

TABLE 1

|  | Example 1 | Example 2 | Comparative Example 3 |
|---|---|---|---|
| Hard Particles | WC | WC | WC |
| Bonding Portion | Ni | Ni | Co |
| Average Particle Size of Hard Particles (µm) | 16 | 110 | 1 |
| Volume Ratio of Bonding Portion to Hard Particles | 50:50 | 50:50 | 15:85 |
| Wear Amount (g) | 0.02 | 0.03 | 0.08 |

As shown in Table 1, the wear-resistant members according to Examples 1 and 2 had the lower wear amount than that of the wear-resistant member of Comparative Example 1.

As can be seen from the above results, according to the present invention, it is possible to provide a wear-resistant member that is hard to wear when it is slidingly contacted with various hard members.

INDUSTRIAL APPLICABILITY

The wear-resistant member according to an embodiment of the present invention can be used as a member that is slidingly contacted with or slides on various members. In particular, the wear-resistant member according to the embodiment of the present invention can be used for a member that is slidingly contacted with various hard members, for example, rolling rolls, engine pistons, bearing housings, automobile suspension members, and the like.

The invention claimed is:

1. A wear-resistant member that is slidingly contacted with a hard member,
    wherein the wear-resistant member is formed of an alloy in which hard particles having an average particle size of 14 to 150 µm are bonded by a bonding portion; and
    wherein the bonding portion consists of one or more selected from Ni and Co;
    wherein the hard member is a cemented carbide formed of a hard phase comprising hard particles, and a bonding phase comprising one or more metals selected from the group consisting of Fe, Co, and Ni; and
    wherein the hard particles included in the hard member have an average particle size of 5 µm or less.

2. The wear-resistant member according to claim 1, wherein the hard member that is slidingly contacted with the wear-resistant member has a Rockwell hardness of 80 or more.

3. The wear-resistant member according to claim 1, wherein the hard particles included in the wear-resistant member comprise one or more selected from carbides, nitrides, silicides, and oxides of W, Ti, Zr, Hf, V, Nb, Ta, Cr and Mo.

4. The wear-resistant member according to claim 3, wherein the hard particles included in the wear-resistant member comprise WC.

5. The wear-resistant member according to claim 1, wherein the wear-resistant member has a volume ratio of the bonding portion to the hard particles of 30:70 to 80:20.

6. The wear-resistant member according to claim 5, wherein the volume ratio of the bonding portion to the hard particles is 40:60 to 60:40.

* * * * *